April 26, 1960    E. A. ADAMSON    2,934,368
OIL SEAL LOADING SPRING
Filed Nov. 9, 1956    2 Sheets-Sheet 1
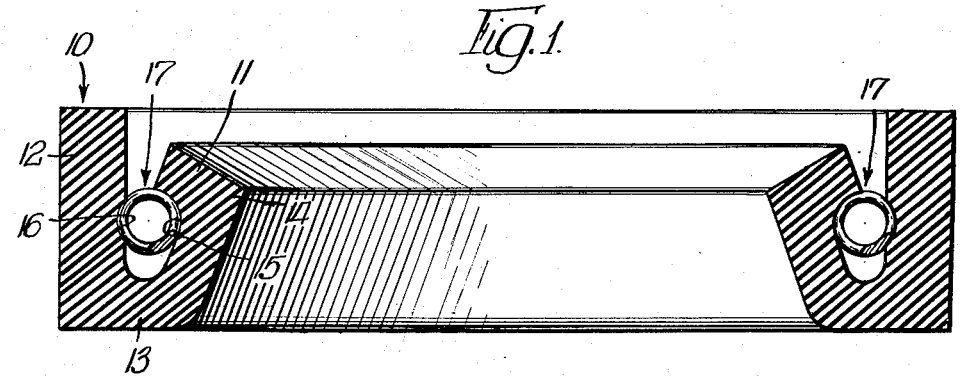
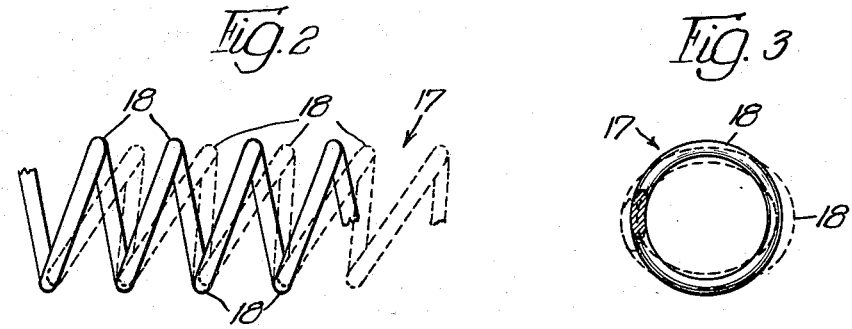
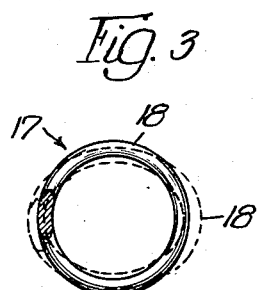
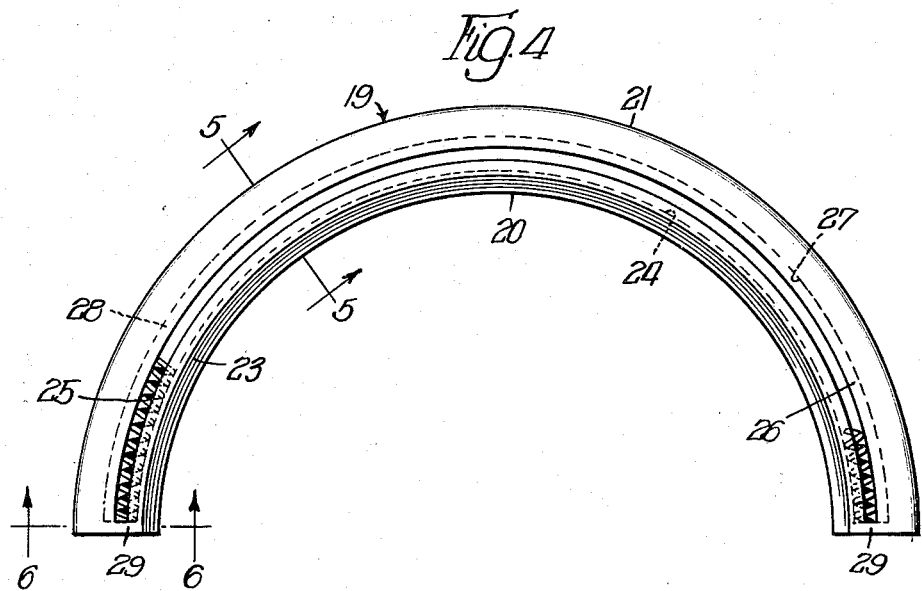
INVENTOR.
Elmer A. Adamson,
BY
Cromwell, Greist & Warden
ATTYS.

April 26, 1960  E. A. ADAMSON  2,934,368
OIL SEAL LOADING SPRING

Filed Nov. 9, 1956  2 Sheets-Sheet 2

INVENTOR.
Elmer A. Adamson,
BY
Cromwell, Greist + Warden
Attys.

United States Patent Office 2,934,368
Patented Apr. 26, 1960

2,934,368

OIL SEAL LOADING SPRING

Elmer A. Adamson, Chicago, Ill., assignor to Chicago Rawhide Manufacturing Company, Chicago, Ill., a corporation of Illinois Application November 9, 1956, Serial No. 621,467

15 Claims. (Cl. 288—2)

The present invention is directed to improvements in oil seal design and functioning and relates more specifically to the use of a new and improved form of oil seal loading spring.

It is an object of the present invention to provide improved forms of oil seals which include the use of a new type of loading spring capable of specific advantageous use in several different applications, the spring improving the functioning of certain forms of oil seals while at the same time eliminating certain complicated and costly manufacturing procedures.

A further object is to provide different types of oil seals which utilize an initially static coil spring laid or trapped within a spring receiving portion of the seals and being of an interrupted or non-continuous nature if desired, the spring being open wound and/or of light gauge readily bendable convolutions for applying compressive load to the sealing portion of each of the different types of seals solely when such sealing portion is flexed toward the spring as when mounted in its operative position in sealing relation with a surface of an element under seal.

Another object is to provide an improved form of oil seal loading spring and manner of mounting the same in operative association with a sealing lip portion of an oil seal, the spring being adapted for use in many different types of oil seals which are either of a circumferentially continuous nature or are formed from cooperating semi-circular separate portions, the spring being particularly adapted for use in a block-V type of oil seal wherein the spring functions to operatively load adjacent sealing lip portions which function in substantially opposite directions, the spring being used in spring mounting spaces of limited area wherein conventional coil springs which are mounted in tensioned condition are normally incapable of operating with sealing lip loading efficiency.

Other objects not specifically set forth will become apparent from the following detailed description made in conjunction with the drawings wherein:

Fig. 1 is a cross sectional view of one form of oil seal utilizing the improved type of loading spring of the present invention;

Fig. 2 is an enlarged fragmentary elevation of a segment of the improved loading spring illustrating one aspect of its functioning;

Fig. 3 is an end elevation of a segment of the loading spring of the present invention illustrating another aspect of its functioning;

Fig. 4 is a plan view of one half of a split seal using the improved loading spring of the present invention;

Figure 5:
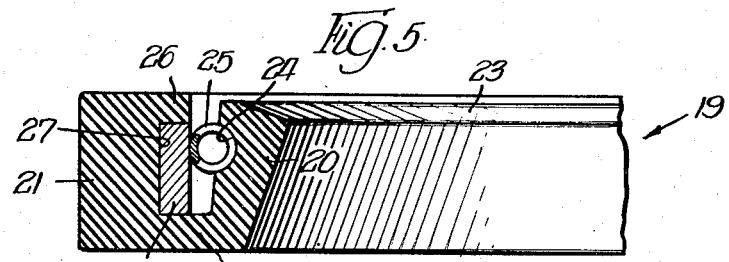
Fig. 5 is an enlarged sectional view of the split seal of Fig. 4 taken generally along line 5—5 of Fig. 4.

The new and improved oil seal loading spring of the present invention is in the form of a coil which in one embodiment may be provided with open wound convolutions of a pitch sufficient to allow the laying over of the convolutions when the spring is radially compressed in its mounted condition in an oil seal. Alternatively or in addition, the spring may be formed from light gauge or relatively thin metal to allow the convolutions to take an oval or elliptical shape under a radially directed compressive load. The coil spring must be provided with one or both of the foregoing features in order to function in the manner to be described. The spring is mounted in operative association with a sealing lip portion of an oil seal in a completely static, detached and non-constricting relation. Where radially acting, circumferentially continuous oil seals are loaded with the spring of the present invention, the sealing lip portion in its unmounted condition is not under compressive load by the static or non-dynamic spring carried thereby. The spring is trapped or held between the material of the oil seal in association with the rear face of the sealing lip portion or portions and no constricting action is present until the seal is mounted relative to a surface and the sealing lip portion or portions are flexed toward the spring thereby compressing the latter in a radial direction. In other words, the spring is mounted relative to the sealing lip portion so as to not constrict or bind the sealing lip portion or portions of the seal in any manner until the seal is placed in its operative position. In this connection the spring may be circumferentially continuous or interrupted while still being capable of providing its loading function.

In Fig. 1 a seal 10 is illustrated which is formed from rubber or rubber-like material to provide a flexible sealing lip portion 11 integrally connected with a block-like body portion 12 by a flexible neck portion 13. The body portion 12 may be suitably held within a metallic casing of any known type and the particular manner in which the seal 10 is mounted is of no significance in connection with describing the principles of the present invention. The sealing lip portion 11 is provided with a radially acting sealing lip 14 and the rear face of the sealing lip portion 11 is provided with a spring retaining groove 15. The oppositely positioned face of the body portion 12 is provided with a cooperating spring retaining groove 16 and the two grooves 15 and 16 trap therebetween the new coil spring 17 of the present invention.

As previously described, the improved spring of the present invention is adapted primarily for use with seals which have an extremely small spring mounting area such as that illustrated in connection with the seal 10. Where a seal is provided with such a small spring mounting area, no purpose is served by the utilization of a conventional form of coil spring which is tensioned when placed in mounted relation to the sealing lip portion 11. In mounting a conventional form of tensioned spring in the seal 10, opposite surfaces of the same are contacted by the material of the sealing lip portion 11 and the body portion 12. Consequently, the spring is unable to change its axial dimension or increase its outside diameter in response to flexing of the sealing lip portion 11 toward the body portion 12. This type of functioning, which is essential in connection with the use of a conventional form of spring, is prevented by reason of the spring being in contact with the fixed body portion 12. Thus the sealing lip portion 11 is prevented from flexing toward the body portion 12 as a conventional form of spring will merely act as a wedge between these elements due to its being unable to change its axial circumferential dimension or, in other words, expand in line with its intended function.

The improved coil spring 17 of the present invention, due to the manner in which it is formed, allows the sealing lip portion 11 to flex toward the body portion 12 and during the course of this flexing the spring 17 resiliently loads the sealing lip portion 11 so as to constantly urge the same to return to its original position relative to the body portion 12. The spring 17 is inserted or laid between the sealing lip portion 11 and the body portion 12 either in a continuous or non-continuous form. The fact that the spring 17 is not tensioned or compressed when mounted in its operative position prior to the use of the seal 10 allows the spring 17 to be used either in a continuous or non-continuous form. In mounting the spring 17 the lip portion 11 is flexed away from the body portion 12 and the spring 17 is laid within the groove 15. Upon release of the lip portion 11 the spring is trapped between the material of the grooves 15 and 16. The spring 17 does not place the sealing lip portion 11 under any compressive constricting forces as is conventional in the use of the known types of coil springs when the seal is in its unmounted condition. Due to the spring 17 being formed from either light gauge material or loosely wound convolutions or both light gauge material and loosely wound convolutions, it is capable of loading a sealing lip portion 11 upon the mounting of the seal 10 in its operative position about a shaft as a result of movement of the sealing lip portion 11 toward the body portion 12.

In Figs. 2 and 3 the operative functioning of the spring 17 is illustrated depending upon the manner in which the spring is formed. Referring particularly to Fig. 2, it will be noted that each of the convolutions 18 forming the spring 17 is provided with an adequate pitch so as to characterize the spring 17 as a loosely or openwound spring. Upon radial compression of the spring 17 as described in connection with the use of the seal 10 of Fig. 1, the convolutions 18 lay over as illustrated by the broken lines in Fig. 2. Where the spring 17 is formed from light gauge metal, radial compression of the spring causes the convolutions to take an elliptical or oval shape as illustrated in broken lines in Fig. 3.

Either the laying over of the convolutions 18 or the elliptical forming of the same will occur depending upon the manner in which the spring 17 is constructed. One of these functions alone is adequate to provide the requisite loading action for the sealing lip portion 11. However, the spring 17 may be formed from light gauge material and the convolutions of the same loosely wound so as to provide a combined action of both the laying over of the convolutions and the compression of the same into an elliptical or oval shape. The fact that these two functions may be relied upon separately is of particular importance. A closely wound coil spring may be used providing the spring is formed from material which is of adequate gauge to allow the convolutions to take an elliptical or oval shape when the spring is radially compressed. Still further, a coil may be formed from a flat strip of light gauge material which is capable of being radially compressed to an extent that the convolutions take an elliptical or oval shape.

As previously described, until the sealing lip portion of the seal having the spring 17 associated therewith is placed under compressive forces by the surface with which it is brought into sealing engagement, the spring 17 does not function to load the sealing lip portion as it is merely held or trapped between cooperating surfaces of the seal. Any loading action attributable to the spring 17 occurs following the operative mounting of the seal carrying the same, this action being due solely to movement of the sealing lip portion radially toward the spring 17 in its trapped condition. Upon the compression of the convolutions 18 of the spring 17 into an elliptical or oval shape and/or upon the forcing of the convolutions 18 to lay over or in effect change the pitch thereof, the spring 17 then provides compressive resilient reaction forces which tend to urge the sealing lip portion toward the surface under seal. The functional characteristics described are due to the manner in which the spring is constructed and an important feature arising from the use of a spring of this type resides in the fact that the spring may be continuous or non-continuous.

In connection with the advantages arising from the use of an interrupted spring, it should be apparent that certain assembling operations may be facilitated by using segments of coil spring material which need not exactly conform with the circumferential dimensions of the particular seal being loaded. As it is necessary to mount the spring in the seal in a non-compressed or non-tensioned condition, it is unnecessary to utilize a circumferentially continuous coil spring. In order to avoid the manufacture of coil springs within rather restrictive tolerances in order that such continuous uninterrupted coil springs may be mounted in a seal in a relaxed or static condition, segments of coil springs may be merely cut from a continuous source and, consequently, restrictive manufacturing tolerances completely avoided. The use of segments of the improved coil spring of the present invention is particularly advantageous with the type of oil seals to be described.

Figure 6:
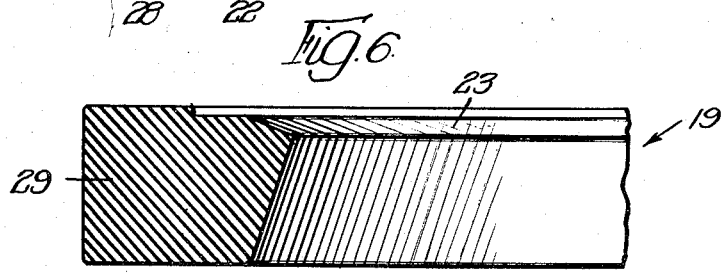
Fig. 6 is an enlarged sectional view of the split seal of Fig. 4 taken generally along line 6—6 of Fig. 4.

Figs. 4-6 illustrate a semi-circular half 19 of a split seal, the general uses and functioning of which are well known. The semi-circular half 19 may be used with a similar semi-circular half member to provide a complete split seal for use in many different types of installations and for purposes of simplification only one half sealing member 19 has been illustrated. The split seal half 19, as particularly shown in Fig. 5, is provided with a radially acting flexible sealing lip portion 20 which is integrally attached to a body portion 21 through a flexible neck portion 22. The sealing lip portion 20 is provided with a radially acting sealing lip 23 and the innermost surface or rear face of the sealing lip portion 20 carries a groove 24 in which is received a coil spring segment 25 formed in the same manner as described in connection with the spring 17. The body portion 21 is provided with a radially inwardly directed flange 26 which defines a groove 27 in which is received a semi-circular metallic ring 28. The outermost surface of the ring provides a trapping or holding surface which cooperates with the surface defining the groove 24 in trapping or holding the spring 25 in its operative position. As previously described in connection with the seal 10, in mounting the spring 25 the sealing lip portion 20 is merely flexed away from the body portion 21, the spring 25 laid in the groove 24 and the sealing lip portion 20 released to return to its original position.

The ends of the semi-circular split seal member 19 are closed off by the rubber or rubber-like material of the seal as illustrated in Fig. 6. In order for the spring 25 to function as desired, the ends of the same need not be attached or imbedded in the material of the seal 19 forming the end faces 29 of the same. As previously described, the spring 25 is merely held between the opposite surfaces of the groove 24 and the ring 28 and in the unmounted condition of the seal 19, the spring is not placed under any appreciable radial compression. Consequently, the sealing lip portion 20 is not loaded until flexed toward the body portion 21.

Manufacturing complications have been experienced in attempting to spring load the sealing lip portions of split seal members due to the non-continuous nature of the coil spring used for this purpose. Consequently, it has been found necessary to imbed or hold the ends of the coil spring segments in or by the material of the seal itself so as to tension the spring segments to impart a positive load on the sealing lip portion 20 prior to the mounting of the split seal member 19 in its operative position. By using the improved type of spring of the present invention, the difficulties and additional costs accompanying the anchoring of the ends of a coil spring segment in the manufacturing of a split seal member are eliminated as it is necessary merely to lay the spring segment 25 into it operative position without anchoring the ends of the same.

Figure 7:
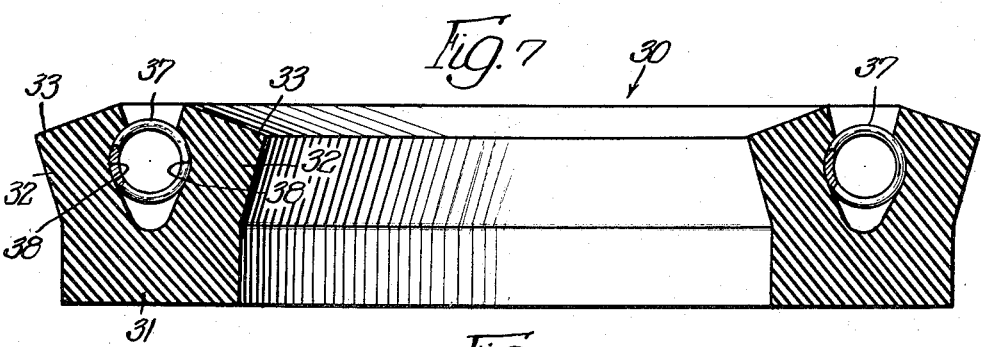
Fig. 7 is a sectional view of a block-V type of seal utilizing the improved loading spring.
Figure 8:
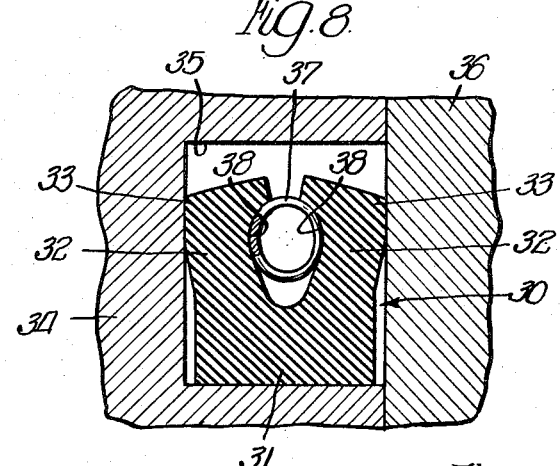
Fig. 8 is a fragmentary sectional view of the block-V seal of Fig. 7 mounted in its operative position and illustrating the functioning of the improved loading spring.

A particularly important use of the spring of the present invention is illustrated in Figs. 7 and 8. A known type of block-V seal 30 is illustrated as being provided with a substantially V-shaped cross section. The seal is formed from a body portion 31 having formed integrally therewith two outwardly divergent sealing lip portions 32. Each of the sealing lip portions 32 are provided with a sealing lip 33 each of which is adapted for independent sealing action. This type of seal is illustrated in use on a piston for sealing engagement with a cylinder wall. In Fig. 8 a piston 34 is shown as being provided with an annular housing groove 35 receiving therein a seal 30. The piston 34 is received within a cylinder 36 and the outermost sealing portion 32 engages the inner wall of the cylinder 36 for reciprocating sealing action between the piston 34 and the cylinder 36. The innermost sealing lip portion 32 engages the inner vertical wall of the groove housing 35 while the bottom surface of the body portion 31 is in engagement with the bottom wall of the groove housing 35.

In utilizing the block-V type of seal it has been considered desirable to load the sealing lip portion 32. Preferably, spring loading should be independently applied to each of the sealing lip portions 32 as each function independently of the other. However, due to space limitations as well as structural limitations, it has been considered impractical to provide each of the sealing lip portions with a separate, independently functioning continuous coil spring which places the sealing lip portion under a compressive load. By utilizing the improved loading spring of the present invention, it is possible to load both of the sealing lip portions 32 with a single spring and at the same time minimize the cost of manufacture of the seal 30.

As shown in Figs. 7 and 8, a spring 37 similar to the spring 17 is trapped or held between opposed inner faces of the sealing lip portions 32. The opposite inner surfaces of the sealing lip portions 32 are each provided with a groove 38 which open toward one another and trap or hold the spring 37 therebetween. Fig. 7 illustrates the shape of the convolutions of the spring 37 prior to the mounting of the seal 30 in its operative position. It will be noted that the convolutions retain their circular shape and positioning and the sealing lip portions 32 are not placed under a compressive load. Upon the mounting of the seal 30 in its operative position as shown in Fig. 8, the sealing lip portions 32 are compressed toward one another and the spring 37 is placed under radial compressive load. The convolutions of the spring 37 take an oval or elliptical shape and/or lay over as previously described in response to the radial compressive action of the sealing lip portions 32. Thus the sealing lip portions 32 are loaded due to the tendency of the convolutions of the spring 37 to return to their initial shape and/or relative positioning. Both of the sealing lip portions 32 are loaded by the use of a single spring 37 which may be readily and easily inserted into its operative position.

While only a few forms of oil seals have been illustrated as adapted for improved functioning with the use of the improved loading spring of the present invention, it should be understood that many additional forms of seals may be provided with the same improved functioning. The pitch of the convolutions of the spring will vary depending upon the particular use made of the spring. The pitch should be such that the convolutions do not imbed themselves or dig into the material of the seal while at the same time allowing them to lay over upon the application of radial compressive forces. The thickness or strength of the individual convolutions in connection with the gauge of metallic material used in forming the same may vary as long as each convolution is capable of attaining an oval or elliptical shape upon the application of radial compressive forces. It should be apparent that the improved type of spring is particularly adapted for use where space is limited. In this connection the laying over and elliptical compression of the convolutions provide additional space for movement of the sealing lip portion of the seal toward the body portion of the same without resulting in a digging in or imbedding of the convolutions of the spring in the material of the seal. In many instances it may be found preferable to make use of a metallic ring such as the ring 28 described in connection with the split seal member 19, thus providing a hard surface along which the convolutions of the spring may slide during the laying over of the same. A metallic ring of this type may be used, of course, in many different kinds of seals and its use is not limited to the split seal type illustrated in Figs. 4–6.

Obviously many modifications and variations of the invention as hereinbefore set forth may be made without departing from the spirt and scope thereof, and therefore only such limitations should be imposed as are indicated in the appended claims.

I claim:

1. An oil seal having a flexible sealing lip portion carrying a spring retaining groove on the back surface thereof opposite its sealing surface, a static coil spring trapped between said groove and a surface forming a part of said seal located opposite said groove, said sealing lip portion being placed under a compressive load by said spring solely when mounted in operative sealing position with the surface of an element to be sealed.

2. An oil seal having a flexible sealing lip portion carrying a spring retaining groove on the back surface thereof opposite its sealing surface, a static coil spring segment laid in said groove and trapped between said groove and a surface forming a part of said seal located opposite said groove, said spring being circumferentially non-continuous and being detached from the material of said seal, said sealing lip portion being place under a compressive load by said spring solely when mounted in operative sealing position with the surface of an element to be sealed.

3. An oil seal assembly including a flexible sealing lip portion backed up by a relatively loosely wound coil spring, said spring being held by the material of said assembly in association with said sealing lip portion to place said sealing lip portion under load solely upon the flexing of said sealing lip portion toward said spring, the pitch of the convolutions of said spring characterizing said spring as loosely and open wound to an extent allowing said convolutions to lay over upon flexure of said sealing lip portion toward the same.

4. An oil seal having a flexible sealing lip portion carrying a spring retaining groove on the back surface thereof opposite its sealing surface, a relatively loosely wound coil spring trapped between said groove and a surface forming a part of said seal located opposite said groove, said spring being interrupted circumferentially thereof and being detached from the material of said seal, said sealing lip portion being placed under compressive load by said spring solely when mounted in operative sealing position with the surface of an element to be sealed.

5. An oil seal formed from complementary semi-circular ring halves, each of said ring halves having a flexible sealing lip portion carrying a spring retaining groove on the back surface thereof opposite its sealing surface, a static coil spring trapped between said groove and a surface forming a part of said ring half located opposite said groove, said spring being in segment form and being detached from the material of said ring half, said sealing lip portion being placed under a compressive load by said spring solely when mounted in operative sealing position with the surface of an element to be sealed.

6. An oil seal formed from complementary semi-circular ring halves, each of said ring halves having a flexible sealing lip portion carrying a spring retaining groove on the back surface thereof opposite its sealing surface, a relatively loosely wound coil spring trapped between said groove and a surface forming a part of said ring half located opposite said groove, said spring being in segment form and being detached from the material of said ring half, said sealing lip portion being placed under a compressive load by said spring solely when mounted in operative sealing position with the surface of an element to be sealed, the pitch of the convolutions of said spring allowing said convolutions to lay over upon flexure of said sealing lip portion towards the same.

7. An oil seal formed from complementary semi-circular ring halves, each of said ring halves having a flexible sealing lip portion carrying a spring retaining groove on the back surface thereof opposite its sealing surface, a static coil spring trapped between said groove and a surface forming a part of said ring half located opposite said groove, said spring being in segment form and being detached from the material of said ring half, said sealing lip portion being placed under a compressive load by said spring solely when mounted in operative sealing position with the surface of an element to be sealed, the gauge of the material forming said spring being such that the convolutions thereof take an oval shape upon flexure of said sealing lip portion towards the same.

8. An oil seal formed from complementary semi-circular ring halves, each of said ring halves having a flexible sealing lip portion carrying a spring retaining groove on the back surface thereof opposite its sealing surface, a relatively loosely wound coil spring trapped between said groove and a surface of a metallic ring segment carried by the body portion of said ring half located opposite said groove, said spring being in segment form and being detached from the material of said ring half, said sealing lip portion being placed under a compressive load by said spring solely when mounted in operative sealing position with the surface of an element to be sealed.

9. An oil seal having a flexible sealing lip portion carrying a spring retaining groove on the back surface thereof opposite its sealing surface, a relatively loosely wound coil spring laid in said groove and trapped between said groove and a surface of a metallic ring segment carried by the body portion of said oil seal located opposite said groove, said spring being detached from the material of said seal, said sealing lip portion being placed under a compressive load by said spring solely when mounted in operative sealing position with the surface of an element to be sealed.

10. An oil seal assembly formed from complementary semi-circular ring halves, each of said ring halves including a flexible sealing lip portion backed up by a relatively loosely wound coil spring segment, said spring being held by the material of said ring half in association with said sealing lip portion to place said spring under load solely upon the flexing of said sealing lip portion toward said spring, the gauge of the material forming said spring and the pitch of the convolutions thereof allowing said convolutions to combinedly lay over and take an oval shape upon flexure of said sealing lip portion toward the same.

11. An oil seal of substantially V-shaped cross section including a body portion having integrally formed therewith two outwardly divergent sealing lip portions, a spring retaining groove on the innermost side surface of each of said sealing lip portions, said grooves being oppositely located and opening toward one another, a static coil spring trapped between the surfaces of said grooves and detached from the material of said seal, said sealing lip portions being placed under a compressive load by said spring solely when mounted in operative sealing position with the surfaces of an element to be sealed.

12. An oil seal of substantially V-shaped cross section including a body portion having integrally formed therewith two outwardly divergent sealing lip portions, a spring retaining groove on the innermost side surface of each of said sealing lip portions, said grooves being oppositely located and opening toward one another, a static coil spring segment laid in and filling both of said grooves, said spring being circumferentially non-continuous and being detached from the material of said seal, said sealing lip portions being placed under a compressive load by said spring solely when mounted in operative sealing position with the surfaces of an element to be sealed.

13. An oil seal of substantially V-shaped cross section including a body portion having integrally formed therewith two outwardly divergent sealing lip portions, a spring retaining groove on the innermost side surface of each of said sealing lip portions, said grooves being oppositely located and opening toward one another, a relatively loosely wound coil spring laid in and filling both of said grooves and being detached from the material of said seal, said sealing lip portions being placed under a compressive load by said spring solely when mounted in operative sealing position with the surfaces of an element to be sealed, the pitch of the convolutions of said spring characterizing said spring as loosely and open wound to an extent that said convolutions lay over upon flexure of at least one of said sealing lip portions toward the other.

14. An oil seal of substantially V-shaped cross section including a body portion having integrally formed therewith two outwardly divergent sealing lip portions, a spring retaining groove on the innermost side surface of each of said sealing lip portions, said grooves being oppositely located and opening toward one another, a static coil spring laid in and filling both of said grooves and being detached from the material of said seal, said sealing lip portions being placed under compressive load by said spring solely when mounted in operative sealing position with the surfaces of an element to be sealed, the gauge of the material forming said spring being such that the convolutions thereof take an oval shape upon flexure of at least one of said sealing lip portions toward the other.

15. An oil seal of substantially V-shaped cross section including a body portion having integrally formed therewith two outwardly divergent sealing lip portions, said sealing lip portions being mutually backed up by a relatively loosely wound coil spring segment, said spring being held by the material of said seal in association with said sealing lip portions to place said spring under load solely upon the flexing of said sealing lip portions toward one another, the gauge of the material forming said spring and the pitch of the convolutions thereof characterizing said spring as loosely and open wound to an extent allowing said convolutions to combinedly lay over and take an oval shape upon flexure of at least one of said sealing lip portions toward the other.

References Cited in the file of this patent

UNITED STATES PATENTS

| | | |
|---|---|---|
| 2,008,682 | Christenson | July 23, 1935 |
| 2,070,637 | Agger | Feb. 16, 1937 |
| 2,070,638 | McCombs | Feb. 16, 1937 |
| 2,210,723 | Kosatka | Aug. 6, 1940 |
| 2,319,392 | Dick | May 18, 1943 |
| 2,487,659 | Lockhead | Nov. 8, 1949 |
| 2,729,481 | Chambers et al. | Jan. 3, 1956 |
| 2,789,847 | Jackson | Apr. 23, 1957 |

FOREIGN PATENTS

| | | |
|---|---|---|
| 700,403 | Germany | Dec. 19, 1940 |
| 735,801 | Great Britain | Aug. 31, 1955 |